April 22, 1958     E. J. CHAM ET AL     2,832,049
APPARATUS RESPONSIVE TO DIRECT QUANTITIES
Filed March 10, 1954     2 Sheets-Sheet 1

WITNESSES
Robert C. Baird
David M. Schiller

INVENTORS
Edward J. Cham &
Willard A. Derr.
BY C. L. Freatman
ATTORNEY

United States Patent Office 2,832,049
Patented Apr. 22, 1958

2,832,049

APPARATUS RESPONSIVE TO DIRECT QUANTITIES

Edward J. Cham, Irwin, and Willard A. Derr, Pittsburgh, Pa., assignors to Westinghouse Electric Corporation, East Pittsburgh, Pa., a corporation of Pennsylvania Application March 10, 1954, Serial No. 415,284

11 Claims. (Cl. 324—140)

This invention relates to apparatus responsive to direct quantities and has particular relation to apparatus for measuring direct quantities present in one or more electrical circuits.

In accordance with the invention, a conversion unit in the form of a direct current transforming device is employed for energizing suitable translating apparatus in accordance with a direct quantity present in a direct current circuit. The translating apparatus may take the form of such devices as electrical relays, electrical measuring instruments and telemetering equipment.

The conversion unit is conveniently energized from an associated direct current circuit through a shunt circuit which is associated with the direct current circuit. The translating apparatus is effectively insulated from the shunt circuit by means of the conversion unit which may be in the form of saturable magnetic core means. The magnetic core means may include control winding means connected for energization from the shunt circuit to control the magnetic condition of the core means in accordance with direct current flowing in the shunt circuit.

The magnetic core means also has impedance winding means associated therewith having an impedance dependent upon the magnetic condition of the core means. Suitable bias winding means may link the core means to produce when energized a predetermined magnetic condition of the core means. Consequently if the translating apparatus is connected for energization from a source of alternating current through the impedance winding means, the current supplied to the translating apparatus will depend on the current flowing in the control winding means which in turn depends upon the current present in the associated direct current circuit. Suitable rectifier means may be provided to convert the alternating output of the core means into a direct quantity for energizing the translating apparatus.

In a preferred embodiment of the invention, the conversion unit includes a pair of magnetic core means each connected for energization in accordance with direct current flowing in the associated circuit to provide two independent alternating output quantities. These output quantities are applied to translating apparatus which includes two independent operating elements connected for separate energization in accordance with the alternating output quanties. By connecting the operating elements for differential energization in accordance with the output quanties, the translating apparatus will produce a resultant response representative of the direct current flowing in the direct current circuit. By reason of the bias winding means such differential energization of the operating elements of the translating apparatus is effective to produce a resultant response which is indicative of the polarity of, and which is proportional to the magnitude of direct current flowing in the direct current circuit over a substantial range of values of such direct current including extremely small and zero values thereof.

Since the output quantities of the conversion unit are insulated from the associated direct current circuit, the outputs of a number of conversion units associated with different direct current circuits may be combined in any desired manner. For example, such combination of the outputs may be utilized for the purpose of totalizing the currents of a plurality of direct current circuits. In accordance with the invention means are provided for connecting the separate outputs of each conversion unit in parallel circuit relation to effect energization of common translating means. Such means may comprise two independent circuits each energized in accordance with a separate one of the outputs of each conversion unit. The translating apparatus may include two independent operating elements connected for separate energization from each of the independent circuits.

Conversion units including magnetic core means which have a single alternating output may also be employed for the purpose of totalizing currents in a number of direct current circuits. Common circuit means may be provided in accordance with the invention to connect the output circuits of such conversion units in parallel circuit relation for energizing common translating apparatus.

It is, therefore, an object of the invention to provide an improved conversion unit responsive to direct quantities.

It is another object of the invention to provide an improved conversion unit responsive to direct quantities having an output circuit insulated from an input circuit.

It is a further object of the invention to provide a conversion unit responsive to a direct current to produce an output quantity having a magnitude proportional to the magnitude of the direct current over a substantial range of values of the direct current including relatively low and zero values thereof.

It is still another object of the invention to provide a translating system including a translator having two separate operating elements connected for independent energization in accordance with the output quantities produced by a single conversion unit.

It is a still further object of the invention to provide a translating system including a common translator energized from common circuit means which connect in parallel circuit relation the output circuits of a plurality of conversion units associated with different direct current circuits.

It is still another object of the invention to provide a plurality of magnetic conversion units each energized from a separate direct current circuit to provide independent output quantities which are combined in parallel circuit relation by common circuit means to produce a resultant quantity representative of a function of direct quantities present in the direct current circuits.

Other objects of the invention will be apparent from the following description taken in conjunction with the accompanying drawings in which.

Figure 1:
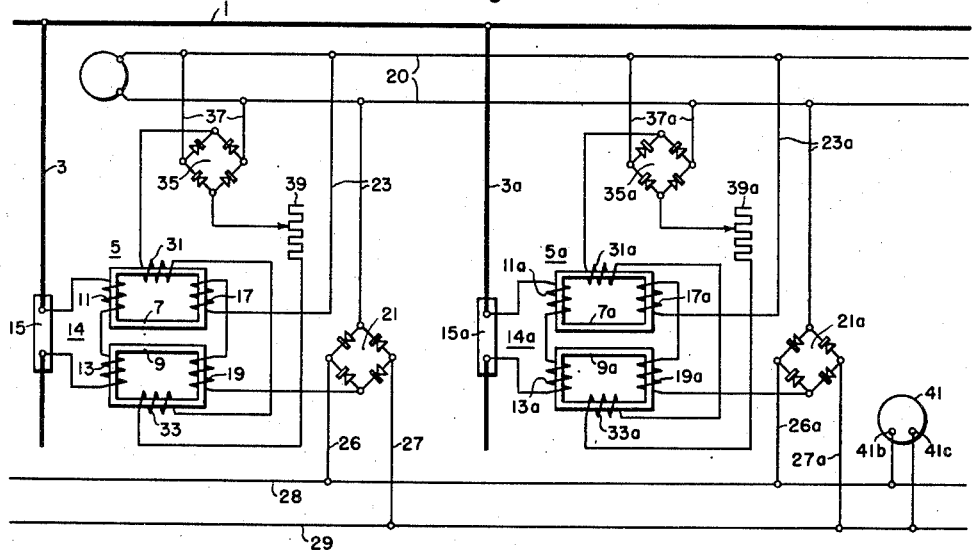
Fig. 1 is a schematic view of an electrical system embodying the invention.

Referring to the drawings, Fig. 1 illustrates an electrical system which includes a bus bar conductor 1 supplying a pair of feeder conductors 3 and 3a each having associated therewith suitable load devices (not shown). The bus bar 1 may be energized from a suitable source of direct current (not shown).

Each of the feeders 3 and 3a has associated therewith a number of similar components. For this reason components associated with the feeder 3 are identified by conventional reference numerals, whereas the similar components associated with the feeder 3a are identified with the same reference numeral with a suffix a.

As illustrated in Fig. 1, a conversion unit represented generally by the numeral 5 is associated with the feeder 3. The unit 5 includes magnetic cores 7 and 9 having respectively control windings 11 and 13 which are included in a common shunt circuit 14. The shunt circuit 14 has a pair of terminals connected to a suitable shunt device 15 of conventional construction which is connected in series circuit relation with the feeder 3. The shunt device 15 is effective to derive a small current from the feeder 3 which is substantially proportional to the current flowing through the feeder 3. This current flows through the shunt circuit 14 and through the series connected control windings 11 and 13. The magnetic cores 7 and 9 may be constructed of any suitable magnetically soft material and are designed to saturate within the rated range of energizations thereof. The control windings 11 and 13 are effective to magnetize the cores 7 and 9 in accordance with direct current flowing in the shunt circuit 14 and consequently, in accordance with direct current flowing through the feeder 3.

Suitable impedance windings 17 and 19 are provided to link respectively the cores 7 and 9 with each of the impedance windings having an impedance dependent upon the magnetic condition of the cores 7 and 9. Low energizations of the cores 7 and 9 by the control windings 11 and 13 are effective to saturate the cores 7 and 9 to a slight degree with the result that the impedance of the impedance windings 17 and 19 is of a substantially high value. As saturation of the cores 7 and 9 is increased by increased energization thereof by the control windings 11 and 13, the impedance of the impedance windings 17 and 19 decreases to a substantially low value.

The impedance windings 17 and 19 are connected to control the alternating output produced by a source of alternating current represented by a pair of conductors 20. Although this controlled output current may be applied directly to effect energization of a suitable translating device, a suitable rectifier 21 is preferably associated with the impedance windings 17 and 19 to produce direct current outputs. The rectifier 21 may be of the barrier layer type, such as a copper oxide rectifier arranged in bridge form for providing full wave rectification, and is illustrated as being connected for energization from the source 20 through the conductors 23 and the impedance windings 17 and 19. The rectifier 21 has a pair of output terminals 26 and 27 which are connected to a pair of conductors 28 and 29 for a purpose appearing hereinafter.

The output current of the source 20 may be effectively controlled by means of the components 7, 11 and 17 alone. However, the performance of the conversion unit 5 is substantially improved by providing the additional components 9, 13 and 19. This may be explained by considering that alternating current flowing from the source 20 through the impedance winding 17 induces an alternating voltage in the control winding 11 which in turn directs alternating current through the shunt circuit 14. This alternating current may be reduced in magnitude by employing a shunt 15 having a substantially high impedance. However, by providing the additional components 9, 13 and 19, such alternating current may be entirely eliminated. To this and the impedance windings 17 and 19 are connected in series circuit relation with the polarities of the connection being selected to cause alternating currents flowing through the windings 17 and 19 to induce alternating voltages in the windings 11 and 13 which are opposed to each other. With such arrangement the windings 17 and 19 have substantially zero resultant coupling to the shunt circuit 14.

The conversion unit 5 has substantially linear transfer characteristics over the operating range thereof except for relatively small values of current flowing in the shunt circuit 14. This means that for small values of direct current in the shunt circuit 14, the magnitude of the alternating output of the conversion unit 5 will deviate to a certain extent from the desired proportional relationship.

In order to eliminate such non-linearity to provide a substantially linear transfer characteristic of the unit 5 over a substantial range of energizations thereof, suitable bias windings 31 and 33 are provided to link the cores 7 and 9 respectively. The bias windings 31 and 33 are shown as being connected in series circuit relation for energization from a source of direct current, which is illustrated as comprising a rectifier unit 35, to effect predetermined magnetization of the cores 7 and 9. Conveniently the rectifier unit 35 is connected for energization from the alternating current source 20 through suitable conductors 37. In order to control the amount of bias supplied by the windings 31 and 33, an adjustable impedance element 39 is provided to permit adjustment of the current flowing through the windings 31 and 33. The windings 31 and 33 are connected with proper polarity to effect cumulative magnetization of the cores 7 and 9 relative to the control windings 11 and 13.

For certain purposes it may be desirable to obtain a response which is representative of a function of direct currents flowing in a number of direct current circuits. As illustrated in Fig. 1, an additional conversion unit 5a identical in all respects to the unit 5 is associated with the feeder 3a. In order to provide a response representative of the total magnitude of direct currents flowing in the feeders 3 and 3a, the invention provides common circuit means for connecting the outputs of the rectifiers 21 and 21a in parallel circuit relation for supplying such outputs to a common translator 41. The common circuit means is illustrated as comprising a pair of electrical conductors 28 and 29 which engage the output terminals of the rectifiers 21 and 21a. The translator 41 is provided with a pair of input terminals 41b and 41c connected respectively to the conductors 28 and 29.

It will be observed that each of the rectifiers 21 and 21a is provided with a pair of terminals of opposite polarity. In order to connect the translator 41 for energization in accordance with the total of the outputs of the rectifiers 21 and 21a, the conductor 28 connects the terminals 26 and 26a of positive polarity to the input terminal 41b of the translator 41 and the conductor 29 connects the terminals 27 and 27a of negative polarity to the input terminal 41c of the translator 41.

It will be recalled that bias windings 31, 33, 31a and 33a are provided to link respectively the cores 7, 9, 7a and 9a in order to effect when energized predetermined magnetization of such cores. The bias windings are thereby effective to establish a substantially linear relationship between the magnitude of the direct current in the associated direct current circuit and the magnitude of the direct output quantity of the associated conversion unit over a substantial range of values of the direct current. However, for a zero value of such direct current, a constant small output quantity will be produced by the associated conversion unit. In order to compensate for this small output quantity the translator 41 is calibrated to produce a zero response for a zero value of direct current flowing in the associated direct current circuits.

Such arrangement provides a very convenient method of effecting the totalization of the currents flowing in a number of direct current circuits. By reason of the constant current characteristics of the conversion units 5 and 5a, the magnitudes of the output currents of the conversion units 5 and 5a are substantially independent of variations in the resistance of the translator 41. Although the conversion units 5 and 5a have been described as responsive to direct currents, such conversion units may also be associated with direct voltages if desired.

Figure 2:
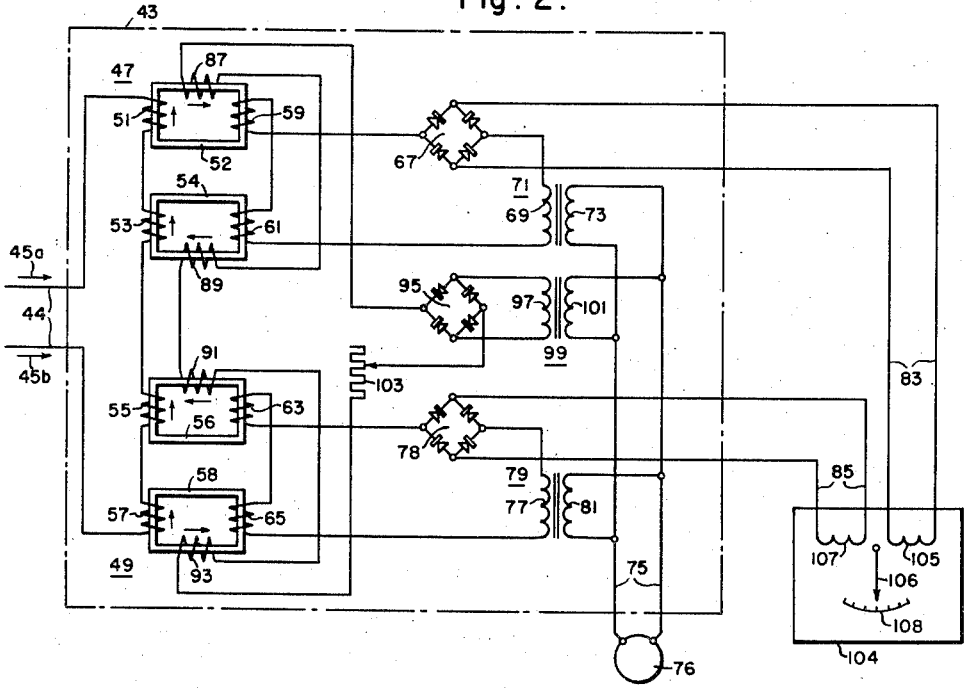
Fig. 2 is a schematic view of a preferred conversion unit.

Referring now to Fig. 2 there is illustrated a conversion unit represented generally by the numeral 43 of a different type than the conversion units 5 and 5a. The conversion unit 43 includes two magnetic core means 47 and 49 each adapted to produce a separate output quantity. Each of the core means 47 and 49 is similar to the conversion unit 5, except for certain differences discussed hereinafter.

The core means 47 and 49 are energized from a common shunt circuit represented by the conductors 44 which may be connected for energization in accordance with either voltage or current of an associated direct current circuit. As illustrated the core means 47 includes a pair of magnetic cores 52 and 54 with a pair of control windings 51 and 53 linking respectively the cores 52 and 54. Preferably, the control windings 51 and 53 are connected in series circuit relation to effect magnetization of the cores 52 and 54 in accordance with direct current flowing in the shunt circuit 44. Suitable impedance windings 59 and 61 are associated with the cores 52 and 54 respectively. Each of the windings 59 and 61 has an impedance dependent upon the magnetic condition of the associated cores 52 and 54 as explained in connection with the conversion unit 5 of Fig. 1.

The magnetic core means 49 is similar to the core means 47 and includes control windings 55 and 57 linking respectively magnetic cores 56 and 58. In addition the core means 49 includes impedance windings 63 and 65 linking respectively the cores 56 and 58 with each of the windings 63 and 65 having an impedance dependent upon the magnetic condition of the associated core. It is noted that each of the core means 47 and 49 includes a pair of impedance windings connected with proper polarity to have substantially zero resultant coupling relative to the associated control windings for the purpose of preventing the induction of undesirable alternating voltages therein.

A suitable rectifier unit 67 may be associated with the windings 59 and 61 of the core means 47 for producing direct current outputs having magnitudes substantially proportional to alternating current flowing through the windings 59 and 61 produced by an alternating current source 76. To this end the rectifier 67 is connected for energization through the windings 59 and 61 from a secondary winding 69 of a transformer 71 which includes a primary winding 73 connected for energization through conductors 75 from the source 76. The output circuit of the rectifier 67 includes a pair of conductors 83 which are connected to terminals of the rectifier 67 of opposite polarity.

In a similar manner the core means 49 may have associated therewith a rectifier 78 which is connected for energization through the impedance windings 63 and 65 from the secondary winding 77 of a transformer 79 which includes a primary winding 81 connected to the conductors 75 for energization from the source 76. The rectifier 78 includes an ouptut circuit represented by the conductors 85 which are connected to terminals of the rectifier 78 of opposite polarity. It is understood that the rectifiers 67 and 78 may be omitted and the alternating outputs of the core means 47 and 49 may be applied directly to suitable translating means.

Each of the core means 47 and 49 may be provided with suitable bias windings linking the cores 52, 54, 56 and 58 for the purpose of effecting predetermined magnetization of such cores. As illustrated, the core means 47 includes bias windings 87 and 89 connected in series circuit relation for energization from a suitable source of direct current. As illustrated the source of direct current comprises a rectifier 95 connected for energization from the source of alternating current 76 through a transformer 99 which includes a secondary winding 97 connected to the input terminals of the rectifier 95 and a primary winding 101 connected to the conductors 75 of the source 76.

In a similar manner the core means 49 is provided with bias windings 91 and 93 associated respectively with the cores 56 and 58 and connected for series energization from a suitable direct current source. Conveniently the bias windings 87, 89, 91 and 93 are connected in series circuit relation for energization from the source of direct current 95. In order to provide an adjustable bias an adjustable impedance 103 may be included in the series circuit which includes the several bias windings to provide an adjustable direct current for energizing the bias windings.

As illustrated in Fig. 2, the bias windings 87 and 89 of the core means 47 are connected with proper polarity to provide cumulative magnetization of the associated cores 52 and 54 relative to the control windings 51 and 53 as indicated by the arrows associated with such windings for current flow in the direction indicated by the arrow 45a adjacent the shunt circuit 44. The bias windings 91 and 93 of the core means 49 are connected with proper polarity to provide differential magnetization of the associated cores 56 and 58 relative to the control windings 55 and 57 as represented by the arrows associated with such windings for the same direction of current flow through the shunt circuit 44.

Figure 4:
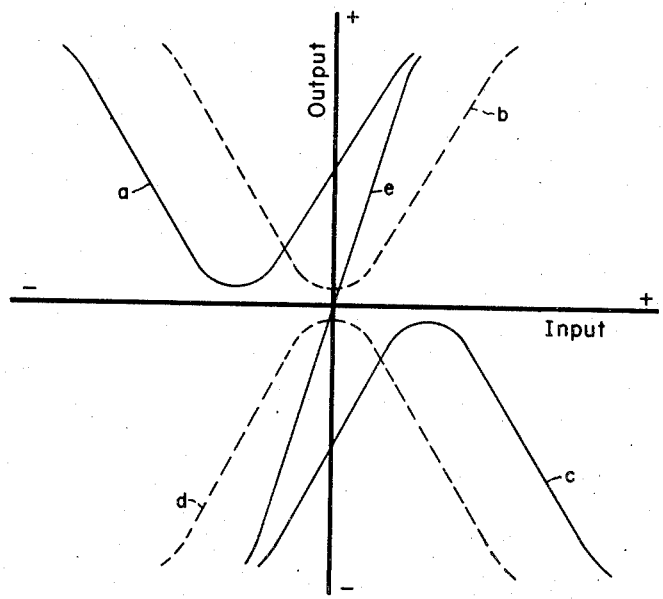
Fig. 4 is a graphical representation showing the relationship between the outputs and inputs of the parts of a conversion unit of the type illustrated in Fig. 2.

With such arrangement of the several bias windings 87, 89, 91 and 93 the conversion unit 43 is rendered responsive to the polarity of direct current flowing in the associated direct current circuit as will presently appear. The nature of the alternating outputs of the core means 47 and 49 which are applied to the rectifiers 67 and 68 are illustrated in Fig. 4. It is observed with reference to Fig. 4 that the output of the core means 47 which is applied to the input terminals of the rectifier 67 may be represented by a curve $a$ which is shifted to the left from the unbiased position represented by the dotted curve $b$ by reason of the cumulative effects of the bias windings 87 and 89, while the output of the core means 49 which is applied to the input terminals of the rectifier 78 may be represented by a curve $c$ which is shifted to the right from the unbiased position represented by the dotted curve $d$ by reason of the differential effects of the bias windings 91 and 93. If the outputs represented by the curves $a$ and $c$ are differentially combined in some manner, the resultant output of the conversion unit 43 may be represented by the curve $e$. The resultant output voltage as represented by the curve $e$ is a reversible differential voltage having linearity for extremely low values of inputs to the core means 47 and 49 including zero values, and having polarity dependent upon the direction of direct current flow in the associated direct current circuit. The polarity responsive characteristics of the conversion unit 43 will now be explained.

Assuming that current flows through the conductors 44 in the direction indicated by the arrow 45a, then the direction of magnetic flux in the cores 52, 54, 56 and 58 may be represented by the arrows adjacent the windings 51, 53, 55 and 57. With the bias windings connected as illustrated in Fig. 2 to produce magnetic flux having directions in the cores represented by the arrows adjacent the several bias windings, it is observed that for such direction of current flow the core means 47 is magnetized to a greater extent than the core means 49 with the result that the output voltage appearing across the conductors 83 is substantially greater than the output voltage appearing across the conductors 85. For current flow in the direction indicated by the arrow 45b, it may be shown in a similar manner that the output voltage appearing across the conductors 85 is substantially greater than the output voltage appearing across the conductors 83.

In order to provide a resultant output quantity from the conversion unit 43 having a magnitude which is proportional to the magnitude of direct current flowing in the associated direct current circuit and which has a polarity dependent upon the direction of flow of such direct current, means are provided in accordance with the invention to differentially combine the output voltages appearing across the conductors 83 and 85. To this end a translating device 104 is connected for energization in accordance with the output voltage of the core means 47 and 49. The translating device 104 may take the form of any suitable electroresponsive device such as an electrical relay or an electrical measuring instrument.

In accordance with the invention the translating device 104 is provided with two separate operating elements 105 and 107 connected respectively to the conductors 83 and 85 for independent energization in accordance with the voltages appearing across such conductors. For purposes of illustration, the elements 105 and 107 are shown as associated with a suitable indicating pointer 106 which cooperates with a suitably calibrated scale 108. The translator 104 may be of the type disclosed in Fig. 15 of U. S. Patent No. 2,508,439. By arranging the elements 105 and 107 to produce when energized differential energizing quantities acting on the pointer 106, the pointer 106 will be actuated in accordance with the magnitude of direct current flowing in the associated direct current circuit. In addition, if the scale 108 is provided with a zero center marking, the translator 104 may be caused to produce a response which is indicative of the polarity of direct current flowing in the associated circuit by reason of the polarity responsive characteristics of the unit 43.

By applying the separate output quantities of the unit 43 to independent operating elements of a translating device, undesirable interaction between such output quantities is eliminated. In addition, variations in resistance of the operating elements 105 and 107 has substantially no effect upon the magnitudes of the separate output quantities by reason of the constant current characteristics of the core means 47 and 49.

Figure 3:
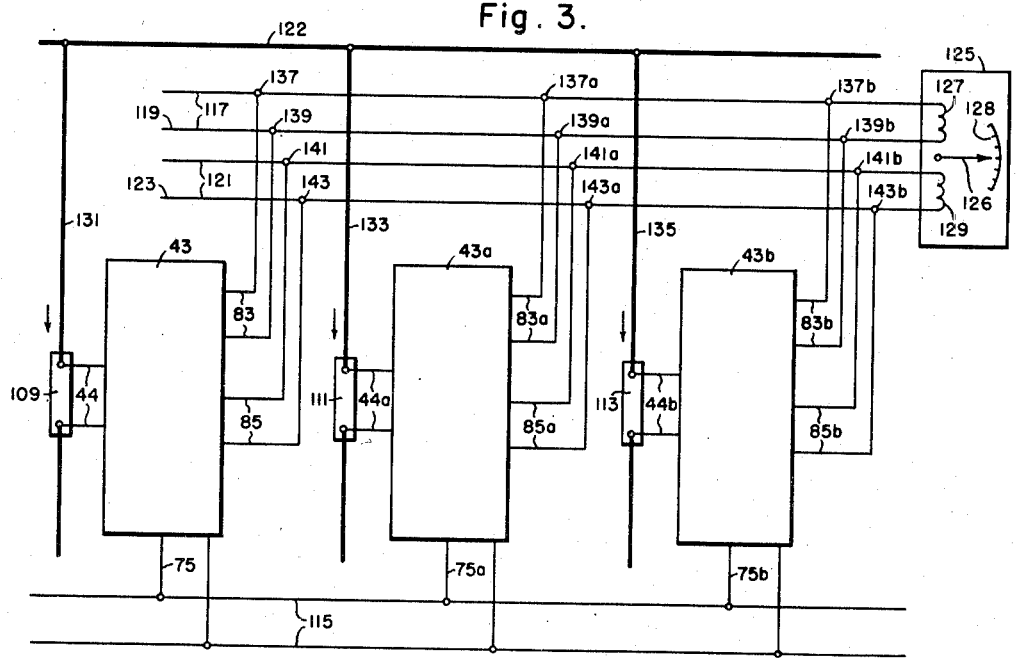
Fig. 3 is a schematic view of an electrical system employing a number of conversion units of the type illustrated in Fig. 2.

For certain installations it may be desirable to obtain a response which is a function of the direct quantities present in a plurality of direct current circuits. Referring now to Fig. 3 there is illustrated a bus bar 122 adapted to supply direct current to a plurality of direct current feeders 131, 133 and 135. Each of the feeders may supply direct current flowing in either of two directions to suitable load devices (not shown) associated with each of the feeders.

As shown in Fig. 3, a conversion unit, such as the conversion unit 43, is associated with each of the feeders 131, 133 and 135. Suitable shunt devices 109, 111 and 113 are connected in series circuit relation respectively with the feeders 131, 133 and 135 for the purpose of directing small direct currents through shunt circuits 44, 44a and 44b respectively for effecting energization of the associated conversion units.

The several conversion units are similar and are represented by the blocks 43, 43a and 43b with each unit including a pair of output circuits. For example, the pair of conductors 83 and the pair of conductors 85 represent the two output circuits of the conversion unit 43. In a similar manner the conductors 83a and 85a represent the two output circuits of the conversion unit 43a. Similarly, the conductors 83b and 85b represent the two output circuits of the conversion unit 43b. Each of the units 43, 43a and 43b is associated with an alternating current source represented by the conductors 115, and are connected for energization therefrom through the conductors 75, 75a and 75b respectively.

In order to provide a response representative of a function of direct currents flowing in the feeders 131, 133 and 135, suitable translating means is provided for energization in accordance with the direct output quantities of the units 43, 43a and 43b. In accordance with the invention a translating device 125, which may be similar to the translator 104, is provided and includes two separate operating elements 127 and 129 with the elements being connected for independent energization in accordance with separate direct quantities produced by the output circuits of the units 43, 43a and 43b. The invention further provides a pair of independent circuits with each circuit being associated with different ones of the output circuits of the several conversion units, and with a separate one of the elements 127 and 129. Conveniently, each of the independent circuits may take the form of a pair of conductors with one of the circuits being represented by the conductors 117 and 119 and with the other circuit being represented by the conductors 121 and 123 of Fig. 3.

Let it be assumed that direct current flows through the feeders 131, 133 and 135 in the directions indicated by the arrows associated with such feeders. In order to produce a resultant direct quantity in the common circuit represented by the conductors 117 and 119 which is representative of the sum of the magnitudes of the direct current outputs of the output circuits 83, 83a and 83b of the several conversion units, the output circuits 83, 83a and 83b are connected to the conductors 117 and 119 in parallel circuit relation with the terminals 137, 137a and 137b thereof of one polarity connected to one of the conductors, such as the conductor 117, and with the terminals 139, 139a and 139b thereof of the other polarity being connected to the conductor 119. In a similar manner the output circuits 85, 85a and 85b are connected to the conductors 121 and 123 in parallel circuit relation with the terminals 141, 141a and 141b thereof of one polarity connected to one of the conductors, such as the conductor 141, and with the terminals 143, 143a and 143b thereof of the other polarity being connected to the conductor 123. With such connections the common circuit represented by the conductors 121 and 123 carries a resultant direct quantity which is representative of the sum of the magnitudes of the direct current outputs of the output circuits 85, 85a and 85b.

With such arrangement the operating element 127 is connected for energization in accordance with the sum of the currents flowing in the output circuits 83, 83a and 83b whereas the operating element 129 is connected for energization in accordance with the sum of the currents flowing in the output circuits 85, 85a and 85b. The elements 127 and 129 may be associated with a suitable indicating pointer 126 which is mounted for movement across a scale 128 in response to a resultant energizing quantity produced by energization of the elements 127 and 129. By arranging the elements 127 and 129 to produce a resultant energizing quantity acting on the pointer 126 which has a magnitude representative of the differential between the direct quantities energizing the elements 127 and 129, the pointer 126 will be actuated in accordance with the sum of the direct currents carried by the feeders 131, 133 and 135.

By reason of the polarity responsive characteristics of the several conversion units 43, 43a and 43b, the response produced by the translating means 125 will depend on the direction of current flow in the feeders 131, 133 and 135. For example, if current in feeder 131 is assumed to flow in the opposite direction from that indicated by the associated arrow, the translating means 125 will produce a response which is different from the response produced thereby when current flows through the feeders in directions indicated by the associated arrows.

Although the invention has been described with reference to certain specific embodiments thereof, numerous modifications falling within the spirit and scope of the invention are possible.

We claim as our invention:

1. In an electrical system, a plurality of direct current circuits, separate magnetic core means associated with each of said circuits, separate control winding means linking each of said core means, each of the control winding means being connected for energization from the associated circuit to magnetize the core means in accordance with a direct quantity present in the associated circuit, separate output winding means linking each of said core means, a source of alternating current, a plurality of rectifier units each having a pair of rectifier output terminals of opposite polarity, each of said rectifier units being connected for energization from the source of alternating current through a separate one of said output winding means, a direct current responsive translating device including first and second input terminals, and common circuit means connecting the rectifier output terminals of one polarity to said first input terminal, and connecting the rectifier output terminals of the other polarity to said second input terminal.

2. In an electrical system, a plurality of electrical conductors adapted to carry direct current, a separate conversion unit associated with each of said conductors, each of the conversion units comprising magnetic core means, control winding means linking said core means, and output winding means linking each of said core means; each of said control winding means being connected for energization from a separate one of said conductors to magnetize the core means in accordance with direct quantities present in the associated conductors, alternating current producing means, a separate rectifier unit associated with each of said core means, each of said rectifier units having a pair of output terminals, each of said rectifier units being connected for energization from said alternating current producing means through a separate one of said output winding means, common circuit means including a pair of electrical conductors, each output terminal of each rectifier unit being connected to a separate one of said electrical conductors, and a direct current responsive translating device including a pair of input terminals each connected to a separate one of said electrical conductors.

3. In a system for obtaining a quantity representative of a function of direct quantities present in a plurality of direct current circuits; a separate conversion unit associated with each of said circuits, each conversion unit comprising a pair of magnetic cores, first windings linking said cores, second windings linking said cores, and third windings linking said cores connected with proper polarity to have substantially zero resultant coupling to the associated first windings; each of said first windings being connected for energization from a separate one of said circuits to effect magnetization of the cores in accordance with direct quantities present in the associated circuits, a source of direct current, said second windings being connected for energization from said source of direct current to effect predetermined magnetization of said cores, a source of alternating current, a separate rectifier unit associated with each conversion unit, each rectifier unit including a pair of output terminals, each of said rectifier units being connected for energization from said source of alternating current through the associated third windings to produce direct output quantities, common circuit means connecting said pairs of output terminals in parallel circuit relation, and a direct current translating device including a pair of input terminals connected for energization from said common circuit means in accordance with a quantity representative of a resultant function of the direct quantities present in said circuits.

4. In a system for obtaining a quantity representative of a function of direct quantities present in a plurality of direct current circuits; a separate conversion unit associated with each of said circuits, each conversion unit comprising a pair of magnetic cores, first windings linking said cores, second windings linking said cores, and third windings linking said cores connected with proper polarity to have substantially zero resultant coupling to the associated first windings; each of said first windings being connected for energization from a separate one of said circuits to effect magnetization of the cores in accordance with direct quantities present in the associated circuits, a source of direct current, said second windings being connected for energization from said source of direct current to effect predetermined magnetization of said cores, a source of alternating current, a separate rectifier unit associated with each conversion unit, each rectifier unit including a pair of output terminals of opposite polarity, each of said rectifier units being connected for energization from said source of alternating current through the associated third windings to produce direct output quantities, common translating means including a pair of input terminals, and common circuit means connecting the rectifier output terminals of one polarity to one of said input terminals, and connecting the rectifier output terminals of the other polarity to the other of said input terminals.

5. In an electrical system, an electrical circuit adapted to carry direct current, a pair of magnetic core means, separate control windings linking each of said core means, each of said control windings being connected for energization from said circuit to magnetize said core means in accordance with direct current flowing in said circuit, separate bias windings linking each of said core means, a source of direct current, each of said bias windings being connected for energization from said source of direct current with proper polarity to provide cumulative energization of the bias windings of one of said core means relative to the control windings of said one of said core means, and to provide differential energization of the bias windings of the other of the core means relative to the control windings of said other of said core means, separate output windings linking each of said core means, a source of alternating current, a separate rectifier unit associated with each of said core means, each of said rectifier units having an output circuit with said output circuits being electrically independent of each other, each of said rectifier units being connected for energization from said source of alternating current through the associated output windings to produce in said output circuits first and second direct output quantities, and a direct current responsive translating device including first and second independent operating elements connected for differential energization in accordance with said first and second direct output quantities respectively to produce a resultant response representative of the magnitude and polarity of direct current in said direct current circuit.

6. In a system for obtaining a quantity representative of a function of direct quantities present in a plurality of direct current circuits; a separate conversion unit associated with each of said circuits, each conversion unit comprising first and second pairs of magnetic cores, separate control windings linking each pair of cores, separate bias windings linking each pair of cores, and separate output windings linking each pair of cores connected with proper polarity to provide substantially zero resultant coupling relative to the associated control windings; the control windings of each of said conversion units being connected for energization from a separate one of said circuits to effect magnetization of the cores in accordance with direct quantities present in the associated circuits, a source of direct current, each of the bias windings being connected for energization from said source of direct current with proper polarity to provide cumulative energization of the bias windings of one pair of cores of each conversion unit relative to the associated control windings, and to provide differential energization of the bias windings of the other pair of cores of each conversion unit relative to the associated control windings, a separate rectifier unit associated with each pair of cores, each rectifier unit having a rectifier output circuit to provide first and second rectifier output circuits for each conversion unit, a source of alternating current, each of said rectifier units being connected for energization from said source of alternating current through the associated output windings to produce in said output circuits direct output quantities, first common circuit means connecting said first rectifier output circuits in parallel circuit relation, second common circuit means electrically independent of said first common circuit means connecting said second rectifier output circuits in parallel circuit relation, and common translating means including first and second operating elements connected for differential energization from said first and second common circuit means respectively to produce a resultant response representative of a function of the direct quantities present in said direct current circuits.

7. In a system for obtaining a quantity representative of a function of direct quantities present in a plurality of direct current circuits; a plurality of conversion units arranged to provide a separate unit for each circuit, each conversion unit comprising magnetic core means, control winding means linking said core means, output winding means linking said core means, and output circuit means including said output winding means; each of said control winding means being connected for energization from a separate one of said circuits to effect magnetization of the core means in accordance with direct quantities present in the associated circuits, a source of alternating current, each of said output winding means being connected for energization from said source of alternating current to produce output quantities in said output circuit means, common circuit means connecting said output circuit means in parallel circuit relation, and a translating device including a pair of input terminal means connected for energization from said common circuit means in accordance with a quantity representative of a resultant function of the direct quantities present in said direct current circuits.

8. In an electrical system, a direct current circuit, first and second pairs of magnetic cores, control windings linking each of said cores, each of said control windings being connected for energization from the direct current circuit to magnetize the cores in accordance with direct current in said circuit, bias windings linking each of said cores, a source of direct current, each of said bias windings being connected for energization from said source of direct current with polarity to provide cumulative energization of the bias windings of one pair of cores relative to the associated control windings, and to provide differential energization of the bias windings of the other pair of cores relative to the associated control windings, output windings linking each of said cores, the output windings of each pair of cores being connected with polarity to have substantially zero resultant coupling relative to the associated control windings, a pair of independent output circuits each including the output windings of a separate pair of cores, a source of alternating current, each of said output windings being connected for energization from the source of alternating current to produce output quantities in said output circuits, and a translating device having a pair of energizable elements each connected for energization from a separate one of said output circuits differentially relative to each other.

9. In an electroresponsive device, a pair of magnetic core means, control winding means linking each of said core means, said control winding means being effective when energized by a first direct quantity to magnetize said core means in accordance with said first quantity, bias winding means linking each of said core means, said bias winding means being effective when energized by a second direct quantity to magnetize one of said core means cumulatively relative to the associated control winding means in accordance with the second quantity, and to magnetize the other of said core means differentially relative to the associated control winding means in accordance with the second quantity, output winding means linking each of said core means for energzation by an alternating quantity, a pair of independent output circuits each including a separate one of said output winding means, and a translating device having a pair of energizable elements each connected for energization from a separate one of said output circuits differentially relative to each other to produce a resultant response representative of the polarity and magnitude of the first direct quantity.

10. In an electroresponsive device, first and second pairs of magnetic cores, a control winding linking each core, said control windings being effective when energized by a first direct quantity to magnetize said cores in accordance with said first quantity, a bias winding linking each core, said bias windings being effective when energized by a second direct quantity to magnetize one pair of cores cumulatively relative to the associated control windings in accordance with the second quantity, and to magnetize the other pair of cores differentially relative to the associated control windings in accordance with the second quantity, an output winding linking each of said cores for energization in accordance with an alternating quantity with zero resultant coupling relative to the control windings of each pair of cores, a pair of rectifier units each energizable by said alternating quantity under control of the output windings of a separate pair of cores, a pair of independent rectifier output circuits, and a translating device having a pair of energizable elements each connected for energization from a separate one of said output circuits differentially relative to each other to produce a resultant response representative of the polarity and magnitude of the first direct quantity.

11. In an electrical system, a plurality of direct current circuits, a separate conversion unit associated with each of said circuits, each conversion unit comprising a pair of magnetic core means, separate control winding means linking each of said core means, separate bias winding means linking each of said core means, separate output winding means linking each of said core means, and first and second output circuits each including a separate one of said output winding means; the control winding means of each conversion unit being connected for energization from a separate one of said circuits to effect magnetization of said core means in accordance with direct quantities present in the associated circuits, direct current producing means, said bias winding means being connected for energization from said direct current producing means with polarity to provide cumulative energization of the bias winding means of one core means of each conversion unit relative to the associated control winding means, and to provide differential energization of the bias winding means of the other means of each conversion unit relative to the associated control winding means, a source of alternating current, said output winding means being connected for energization from said source of alternating current to produce output quantities in said output circuits, first common circuit means connecting said first output circuits in parallel circuit relation, second common circuit means electrically independent of said first common circuit means connecting said second output circuits in parallel circuit relation, and a translating device including first and second operating elements connected for differential energization from said first and second common circuit means respectively to produce a resultant response representative of a function of the direct quantities present in said direct current circuits.

References Cited in the file of this patent

UNITED STATES PATENTS

| | | |
|---|---|---|
| 2,338,423 | Geyger | Jan. 4, 1944 |
| 2,689,328 | Logan | Sept. 14, 1954 |
| 2,775,733 | Winobrad | Dec. 25, 1956 |

(Other references on following page)

OTHER REFERENCES

Article by Sven-Eric Hedstroem and Lennart F. Borg, published in Electronics, September 1948, pages 88–93. Copies available from Scientific Library and 179–171–MA (only pages 88 and 91 relied upon).

Article by H. S. Sack, R. T. Beyer, G. H. Miller, and J. W. Trischka, published in Proceedings of the I. R. E., November 1947, pages 1375–1382. Copies available from Scientific Library and 179–171–MA (only pages 1380 and 1381 relied upon).

Article by R. A. Ramey, published in Electrical Engineering, September 1953, pages 791–795. Copies available from Scientific Library and 179–171–MA (only page 794 relied upon).

"The Magnetic Amplifier" (Reyner), published by Rockliff, London, 1953. Fig. 6, page 19; Fig. 12, page 23; and pages 52–54 relied upon. Copies available in Scientific Library.